(12) United States Patent
Ream et al.

(10) Patent No.: US 12,539,669 B2
(45) Date of Patent: *Feb. 3, 2026

(54) COAXIAL LASER-WIRE OPTICAL SYSTEM FOR USE IN ADDITIVE MANUFACTURING

(71) Applicant: Edison Welding Institute, Inc., Columbus, OH (US)

(72) Inventors: Stanley L. Ream, Columbus, OH (US); Craig T. Walters, Powell, OH (US); Jacob Hay, Circleville, OH (US)

(*) Notice: Subject to any disclaimer, the term of this patent is extended or adjusted under 35 U.S.C. 154(b) by 723 days.

This patent is subject to a terminal disclaimer.

(21) Appl. No.: 17/002,871

(22) Filed: Aug. 26, 2020

(65) Prior Publication Data

US 2021/0060861 A1 Mar. 4, 2021

Related U.S. Application Data

(60) Provisional application No. 62/892,163, filed on Aug. 27, 2019.

(51) Int. Cl.
*B29C 64/268* (2017.01)
*B23K 26/06* (2014.01)
(Continued)

(52) U.S. Cl.
CPC .......... *B29C 64/268* (2017.08); *B29C 64/209* (2017.08); *B29C 64/25* (2017.08);
(Continued)

(58) Field of Classification Search
CPC .............. B23K 26/064; B23K 26/0643; B23K 26/1462; B23K 26/1464; B23K 26/1476;
(Continued)

(56) References Cited

U.S. PATENT DOCUMENTS

| 4,089,595 A * | 5/1978 | Simmons | G02B 27/18 |
| | | | 359/859 |
| 6,294,754 B1 * | 9/2001 | Nagura | B23K 26/1438 |
| | | | 219/121.84 |

(Continued)

FOREIGN PATENT DOCUMENTS

| CN | 104611696 A * | 5/2015 | ............... B05B 7/16 |
| WO | WO-2009039753 A1 * | 4/2009 | ......... B23K 26/0734 |
| WO | WO-2011082582 A1 * | 7/2011 | ............. B05B 7/228 |

OTHER PUBLICATIONS

Espacenet machine translation of Fu et al., WO 2011082582 A1, originally published 2011 (Year: 2011).*

(Continued)

*Primary Examiner* — Seyed Masoud Malekzadeh
*Assistant Examiner* — Jennifer L Groux

(57) ABSTRACT

A feed head apparatus for use in laser wire additive manufacturing, comprising an optical housing adapted to receive a laser beam therein and a wire therein, wherein the wire is adapted for use in additive manufacturing; a first reflective optic for receiving and reflecting the laser beam; and a second reflective optic for receiving laser light reflected by the first reflective optic, wherein the second reflective optic directs the laser light received from the first reflective optic onto the wire in a cylindrical configuration such that the wire and the cylinder of laser light are coaxial with regard to one another within a portion of the optical housing.

4 Claims, 6 Drawing Sheets

(51) Int. Cl.
*B23K 26/34* (2014.01)
*B29C 64/209* (2017.01)
*B29C 64/25* (2017.01)
*B29C 64/364* (2017.01)
*B33Y 30/00* (2015.01)
B23K 26/12 (2014.01)

(52) U.S. Cl.
CPC ........ *B29C 64/364* (2017.08); *B23K 26/0643* (2013.01); *B23K 26/123* (2013.01); *B23K 26/34* (2013.01); *B33Y 30/00* (2014.12)

(58) Field of Classification Search
CPC ...... B23K 26/21; B23K 26/34; B23K 26/342; B23K 26/348; B23K 15/0086; B23K 9/173; B23K 26/14; B23K 9/04; B23K 9/042; B23K 9/044; B23K 1/0056; B23K 26/24; B23K 26/06; B23K 26/00; B23K 20/004; B23K 26/073; B23K 26/0734; B22F 12/50; B22F 12/53; B22F 10/20; B22F 10/22; B22F 10/25; B22F 12/55; B22F 3/115; B22F 12/40; B22F 12/41; C23C 24/00; C23C 4/00; C23C 4/131; C23C 4/123; C23C 24/103; C23C 26/02; C23C 16/54; C23C 24/08; C23C 14/56; C23C 16/06; C23C 24/10; B05B 7/22; B05B 7/222; B05B 7/224; B05B 7/228; B05B 7/16; B33Y 10/00; B33Y 30/00; B33Y 50/00; B33Y 50/02; B29C 64/118; B29C 64/209; B28B 1/001; G02B 27/0938; G02B 27/0977; G02B 27/0983
See application file for complete search history.

(56) References Cited

U.S. PATENT DOCUMENTS

| | | | |
|---|---|---|---|
| 2002/0017509 A1* | 2/2002 | Ishide | B23K 26/0884 |
| | | | 219/121.77 |
| 2003/0116542 A1* | 6/2003 | McGregor | B23K 35/0255 |
| | | | 219/121.64 |
| 2005/0056628 A1 | 3/2005 | Hu | |
| 2017/0312856 A1 | 11/2017 | Chivel | |
| 2018/0160567 A1 | 6/2018 | Williams et al. | |
| 2018/0185960 A1 | 7/2018 | Coskun et al. | |
| 2018/0318929 A1 | 11/2018 | Matthews et al. | |
| 2020/0023468 A1* | 1/2020 | Agosti | B23K 26/14 |
| 2021/0008662 A1* | 1/2021 | Kubisch | B23K 26/0643 |
| 2022/0226931 A1* | 7/2022 | Kotar | B23K 26/24 |

OTHER PUBLICATIONS

Young, Lee; PCT International Search Report for PCT/US2020/047880; dated Nov. 20, 2020; 2 pages.

* cited by examiner

COAXIAL LASER-WIRE OPTICAL SYSTEM FOR USE IN ADDITIVE MANUFACTURING

CROSS-REFERENCE TO RELATED APPLICATIONS

This patent application claims the benefit of U.S. Provisional Patent Application Ser. No. 62/892,163 filed on Aug. 27, 2019 and entitled "Coaxial Laser/Wire Optical System for Use in Additive Manufacturing," the disclosure of which is hereby incorporated by reference herein in its entirety and made part of the present U.S. utility patent application for all purposes.

BACKGROUND

The described invention relates in general to additive manufacturing systems, and more specifically to a laser beam wire deposition additive manufacturing system that includes multiple reflective optics that permit a coaxial configuration of the wire and the laser beam.

Additive Manufacturing (AM) also known as cladding, surfacing and 3D printing has been used for many years to solve engineering challenges from surface treatment of production parts to repair of worn parts for resale as re-manufactured parts. AM has become a worldwide focus of interest, development, and investment in virtually every industrial and military manufacturing sector. Increasingly, this focus is broadening to include AM processes that exhibit higher productivity, as measured by the mass of material produced per unit of time. The higher rate deposition AM processes fall into a class called "direct energy deposition (DED)", which can be characterized by material type and the type of energy source used. Material types can be further refined to powder and wire. Energy sources include laser beam, electron beam, plasma and electric arc. The most productive wire-based systems include gas metal arc welding (GMAW), electron beam (EBW) wire deposition, and laser beam (LBW) wire deposition. Each of these DED, AM solutions has its own set of productivity constraints, which are usually related to the method of energy delivery to the AM wire. EBW is hampered by vacuum requirements; GMAW is challenged by arc physics; and laser solutions are currently limited by the laser power delivery capability of available optical devices.

Currently available laser beam wire deposition optical devices and systems require one or more transmissive, laser beam delivery optical elements. Because transmissive optical elements are comparatively fragile and are frequently hampered by process contamination, these elements limit the power that can predictably be delivered for melting the wire used in the additive manufacturing process. Another common limitation of the laser wire additive manufacturing process is the unidirectional nature of the process when a laser beam is delivered onto only one side of the AM wire. To address this, certain prior art systems utilize "coaxial" delivery of the laser beam to the AM wire rather than off-set delivery.

Coaxial wire feed heads allow for omnidirectional material deposition by supplying wire through the center of an optical system, normal to the work plane, potentially simplifying the laser directed energy deposition (L-DED) process. Using this technology, AM "builds" and repairs no longer require complex motion to ensure that the wire feed maintains a specific heading relative to the direction of travel to obtain process consistency. However, currently available optical systems still require the use of transmissive optical elements which limit the consistency and amount of laser power that can be delivered to the process, in turn restricting the maximum material deposition rates achievable. These heads also require the use of protective transmissive window(s) that are prone to contamination and thermal distortion, potentially limiting process robustness. Accordingly, there is an ongoing need for a coaxial laser beam wire deposition device that includes optics that overcome the limitations of the prior art.

SUMMARY

The following provides a summary of certain example implementations of the disclosed inventive subject matter. This summary is not an extensive overview and is not intended to identify key or critical aspects or elements of the disclosed inventive subject matter or to delineate its scope. However, it is to be understood that the use of indefinite articles in the language used to describe and claim the disclosed inventive subject matter is not intended in any way to limit the described inventive subject matter. Rather the use of "a" or "an" should be interpreted to mean "at least one" or "one or more".

One implementation provides a first apparatus for use in laser wire additive manufacturing. This apparatus comprises an optical housing adapted to receive a laser beam therein and a wire therein, wherein the wire is adapted for use in additive manufacturing; a first reflective optic for receiving and reflecting the laser beam; and a second reflective optic for receiving laser light reflected by the first reflective optic, wherein the second reflective optic directs the laser light received from the first reflective optic onto the wire in a cylindrical configuration such that the wire and the cylinder of laser light are coaxial with regard to one another within the optical housing. The apparatus may further include a shielded conduit positioned within the optical housing at a predetermined angle, wherein the shielded conduit is adapted to receive the wire therein. The apparatus may further include at least one gas inlet formed in the optical housing, wherein the gas inlet is adapted to receive pressurized gas therethrough, and wherein the pressurized gas provides shielding at a work surface involving the wire. The apparatus may further include a plate for supporting the first reflective optic, wherein the supportive plate is adapted to provide cooling water to the interior of the optical housing and wherein the supportive plate includes a plurality of spokes formed therein for allowing reflected laser light to pass therethrough. The apparatus may further include a wire alignment device disposed with the optical housing, wherein the wire alignment device is operative to position the wire coaxially with the laser beam and perpendicular to a work surface. The apparatus may further include an aerodynamic window disposed within the optical housing for preventing contaminants from damaging the reflective optics. The first reflective optic may be a conical mirror or a toroidal mirror and the second reflective optic may be a toroidal mirror.

Another implementation provides a second apparatus for use in laser wire additive manufacturing. This apparatus comprises an optical housing, wherein the optical housing includes an upper portion, wherein the upper portion is adapted to connect to a laser, and wherein the laser directs a laser beam into and through the optical housing; a middle portion connected to the upper portion; and a lower portion connected to the middle portion; a conduit disposed within the optical housing at a predetermined angle, wherein the conduit passes through the upper, middle, and lower portions of the optical housing; a wire disposed within the conduit, wherein the wire is adapted for use in additive manufacturing; a nozzle connected to the lower portion of the housing for receiving the wire from the conduit; an alignment mechanism disposed within the nozzle, wherein the alignment mechanism reorients the wire exiting the lower portion of the optical housing into a position coaxial with the laser beam and perpendicular to a work surface; a first reflective optic disposed within the middle portion of the housing for receiving and reflecting the laser beam; and a second reflective optic disposed within the middle portion of the housing for receiving laser light reflected by the first reflective optic, wherein the second reflective optic directs the laser light received from the first reflective optic onto the wire in a cylindrical configuration such that the wire and the cylinder of laser light are coaxial with regard to one another within the nozzle. The apparatus may further include at least one gas inlet formed in the optical housing, wherein the gas inlet is adapted to receive pressurized gas therethrough, and wherein the pressurized gas provides shielding at the work surface. The apparatus may further include at least one water inlet and at least one water exit for allowing cooling water to flow into and through the optical housing for cooling the first reflective optic. The apparatus may further include a plate for supporting the first reflective optic, wherein the supportive plate is adapted to provide cooling water to first reflective optic, and wherein the supportive plate includes a plurality of spokes formed therein for allowing reflected laser light to pass therethrough. The apparatus may further include an aerodynamic window disposed within the nozzle for preventing contaminants from damaging the reflective optics. The conduit may be shielded. The first reflective optic may be a conical mirror or a toroidal mirror and the second reflective optic may be a toroidal mirror.

Still another implementation provides a third apparatus for use in laser wire additive manufacturing. This apparatus comprises an optical housing, wherein the optical housing includes an upper portion, wherein the upper portion is adapted to be connected to a laser, and wherein the laser directs a laser beam into and through the optical housing; a middle portion connected to the upper portion; and a lower portion connected to the middle portion; a conduit disposed within the optical housing at a predetermined angle, wherein the conduit passes through the upper, middle, and lower portions of the optical housing; a wire disposed within the conduit, wherein the wire is adapted for use in additive manufacturing; a nozzle connected to the lower portion of the housing for receiving the wire from the conduit, wherein the nozzle includes an aerodynamic window formed therein; an alignment mechanism disposed within the nozzle, wherein the alignment mechanism reorients the wire exiting the lower portion of the optical housing into a position coaxial with the laser beam and perpendicular to a work surface; a first reflective optic disposed within the middle portion of the housing for receiving and reflecting the laser beam, wherein the first reflective optic includes a conical mirror or a toroidal mirror; and a second reflective optic disposed within the middle portion of the housing for receiving laser light reflected by the first reflective optic, wherein the second reflective optic includes a toroidal mirror, wherein the second reflective optic directs the laser light received from the first reflective optic onto the wire in a cylindrical configuration such that the wire and the cylinder of laser light are coaxial with regard to one another within the nozzle. The apparatus may comprise at least one gas inlet formed in the optical housing, wherein the gas inlet is adapted to receive pressurized gas therethrough, and wherein the pressurized gas provides shielding at the work surface. The apparatus may comprise at least one water inlet and at least one water exit for allowing cooling water to flow into and through the optical housing for cooling the first reflective optic. The apparatus may comprise a plate for supporting the first reflective optic, wherein the supportive plate is adapted to provide cooling water to first reflective optic, and wherein the supportive plate includes a plurality of spokes formed therein for allowing reflected laser light to pass therethrough. The conduit may be shielded.

It should be appreciated that all combinations of the foregoing concepts and additional concepts discussed in greater detail below (provided such concepts are not mutually inconsistent) are contemplated as being part of the inventive subject matter disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed inventive subject matter and, together with the general description given above and detailed description given below, serve to explain the principles of the disclosed subject matter, and wherein.

DETAILED DESCRIPTION

Figure 1:
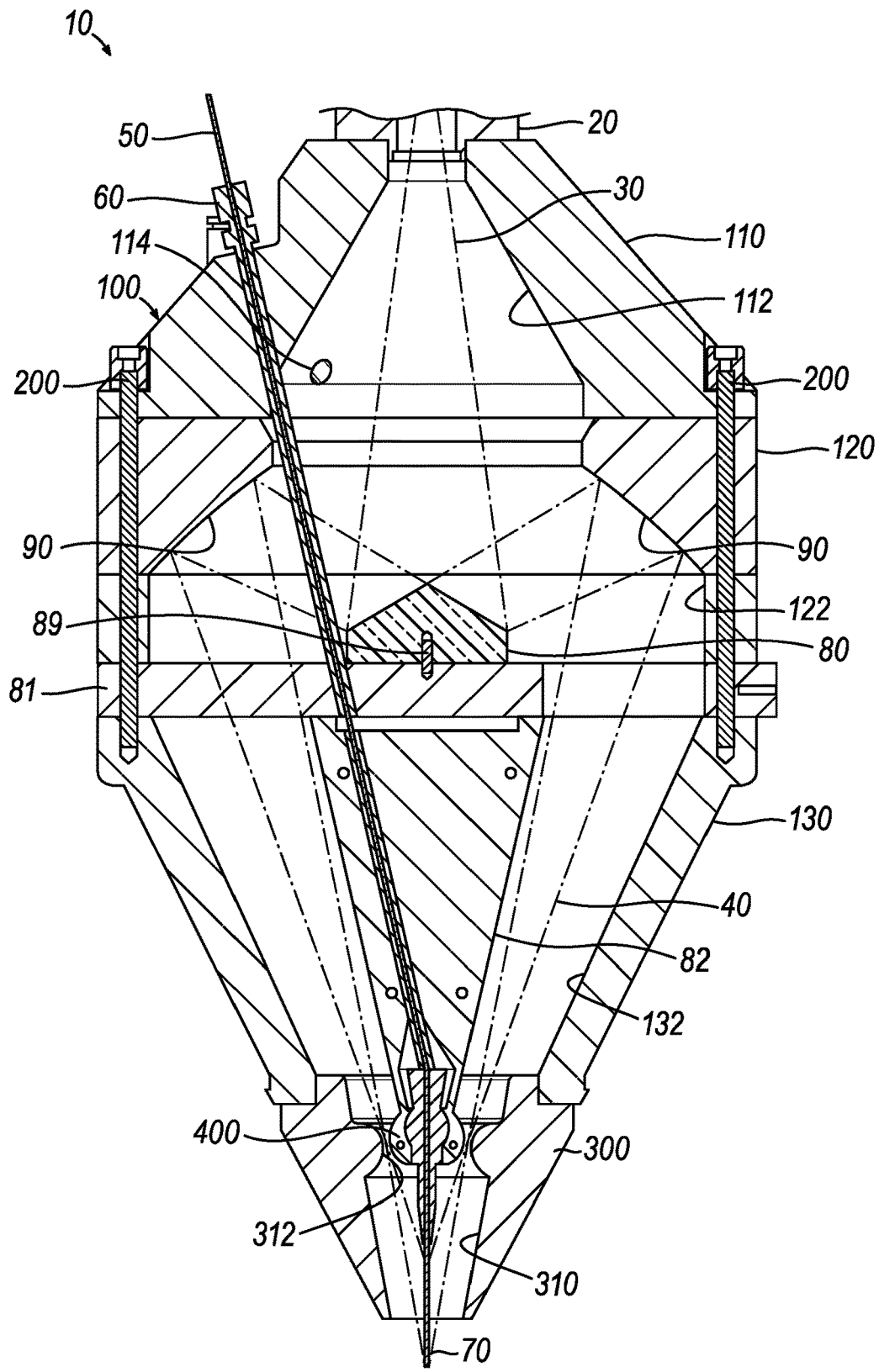
FIG. 1 depicts a cross-sectional view of an example implementation of a coaxial laser/wire optical system and apparatus for use in additive manufacturing processes.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed inventive subject matter. Accordingly, the following implementations are set forth without any loss of generality to, and without imposing limitations upon, the claimed subject matter.

Laser-based wire-feed systems, such as Laser Metal Deposition-wire (LMD-w) systems, feed wire through a nozzle, wherein the wire is melted by a laser. The nozzle incorporates inert gas shielding in either an open environment (gas surrounding the laser), or in a sealed gas enclosure or chamber. This process provides higher deposition rates as compared with powder bed and blown powder DED AM processes. However, as described above, the transmissive optics used with these systems create significant limitations with regard to the consistency and amount of laser power that can be delivered to an additive manufacturing process. The disclosed technology eliminates the power limitations of coaxial laser wire AM DED and provides substantially higher metal deposition rates during additive manufacturing.

Commercially available coaxial wire feed heads typically include laser power limitations of 6 kW, which restrict the maximum deposition rate to 250 $cm^3$/hr (4.41 lb/hr) for stainless steel with a density of 8 $g/cm^3$. With a 1.6 mm wire diameter, wire feed speeds of approximately 2.0 m/min (78.7 in/min) are required. Standard wire feeders can supply wire at rates up to 25.4 m/min (1,000 in/min) or greater. However, with additional laser power available, higher wire feed speeds are possible. If wire feed speeds of 6.3 m/min (250 in/min) or 12.6 m/min (500 in/min) are utilized at higher laser powers, travel speed deposition rates of 766 $cm^3$/hr and 1532 $cm^3$/hr, or in stainless steel 13.5 lb/hr and 27.1 lb/hr, respectfully, are potentially achievable (1.6 mm wire diameter and 8 $g/cm^3$ density).

Example implementations of the disclosed system and apparatus are capable of accommodating the laser power levels required for the above listed deposition rates. The system and apparatus are capable of handling laser powers up to 20 kW by removing transmissive optics including cover windows that are prone to shift or damage at long-term high-power tasks. This increased power allows for increased energy delivery to the work surface and increased material deposition rates. A fully reflective and water-cooled design, in conjunction with an aerodynamic window, provides a stable laser beam at high laser powers and eliminates the need for protective transmissive windows. The fully reflective design also makes the system wavelength independent, allowing it to be compatible with many laser types and adaptable fiber connector mounts allow the system to be used with many commercially available lasers products.

With reference to the example implementations shown in FIG. 1, the disclosed technology provides a system and more particularly, an apparatus that utilizes two paired reflective, rather than transmissive, beam delivery optics to accomplish coaxial delivery of virtually unlimited laser power to the AM wire. The reflective optical elements of the invention (i.e., a conical or toroidal mirror and a toroidal mirror) are much more stable and have much higher resistance to laser damage and distortion than transmissive beam delivery elements. Furthermore, the reflective focus optics in the invention are sufficiently distant from the AM process zone and are protected by an aerodynamic window such that contamination of the optical region of the device is greatly reduced or largely eliminated.

Figure 2:
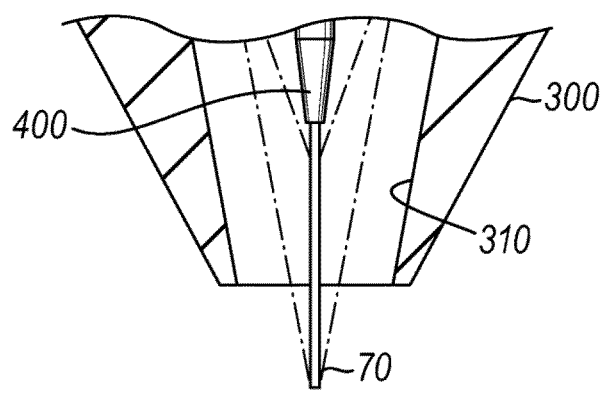
FIG. 2 depicts a close-up view of the nozzle component of the system and apparatus of FIG. 1.
Figure 3A:
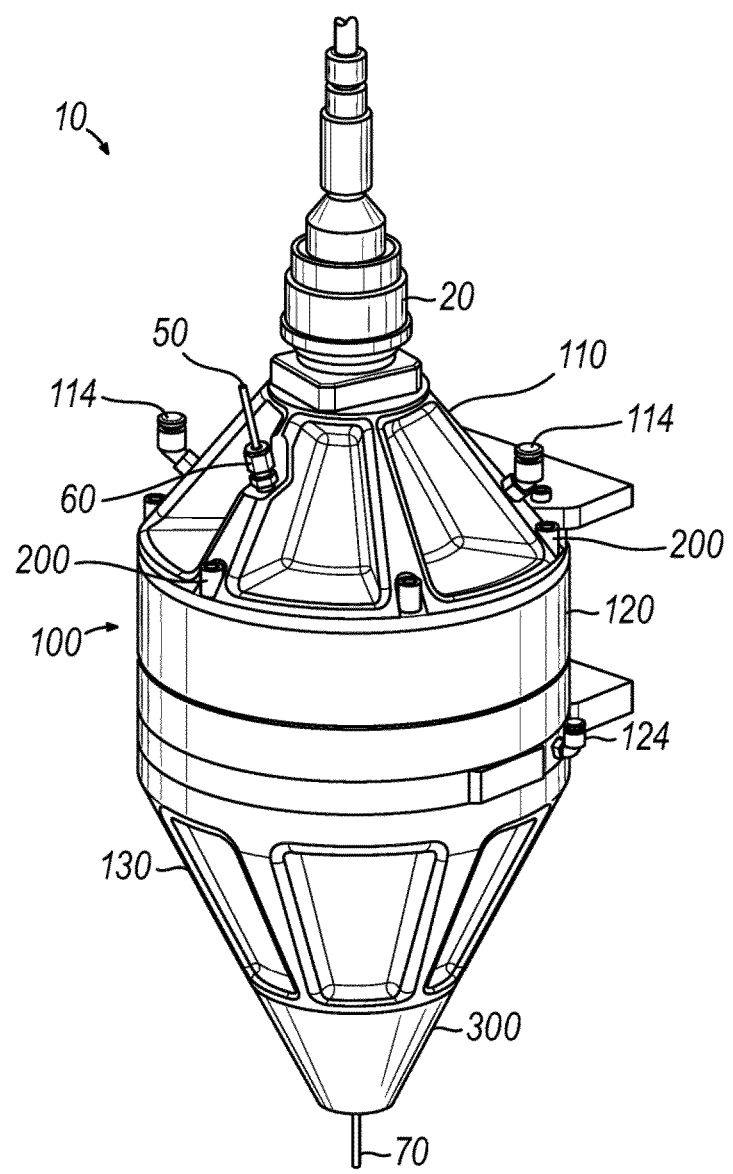
FIG. 3A depicts a perspective view of the nozzle component of the system and apparatus of FIG. 1, wherein the system and apparatus is fully assembled.
Figure 3B:
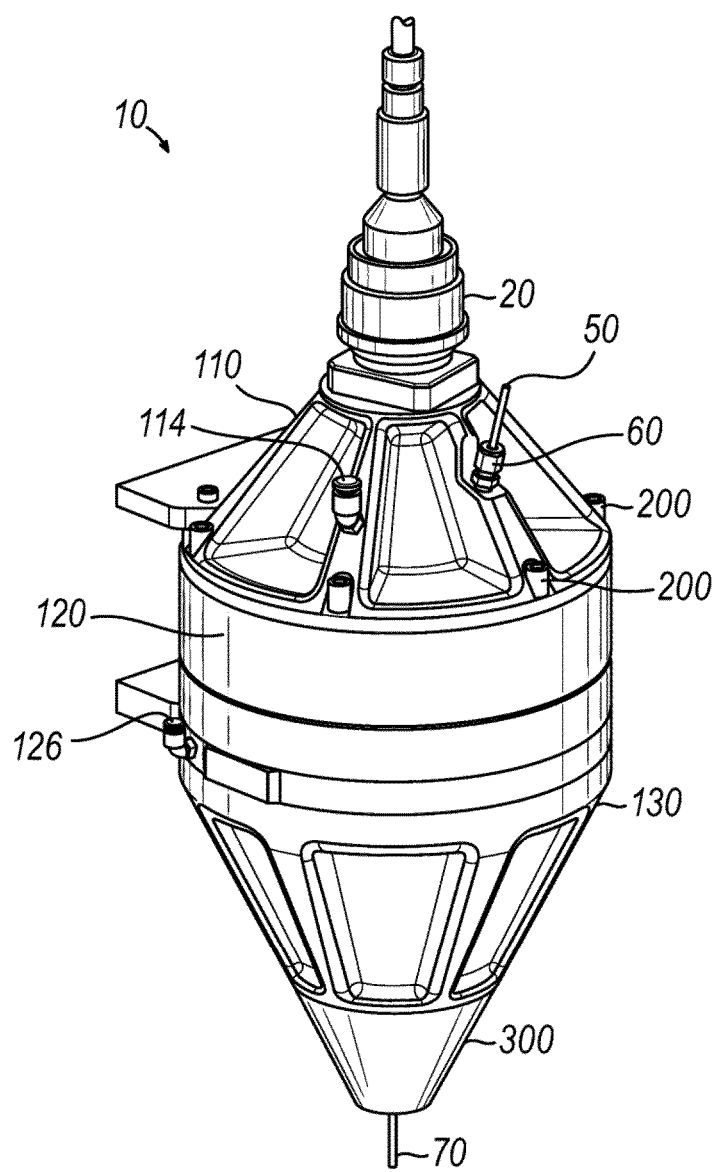
FIG. 3B depicts an alternate perspective view of the nozzle component of the system and apparatus of FIG. 1, wherein the system and apparatus are fully assembled.
Figure 4:
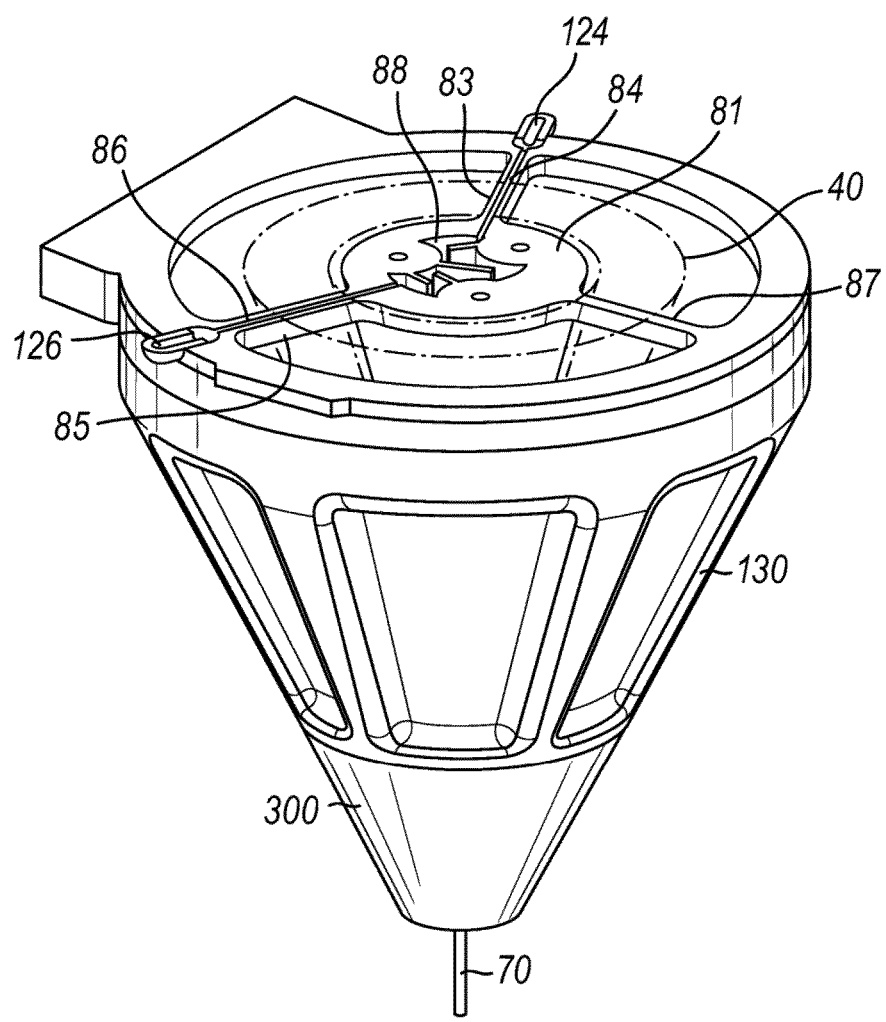
FIG. 4 depicts a perspective view of the spoked support plate, central support, and lower housing portion of the system and apparatus of FIG. 1.
Figure 5:
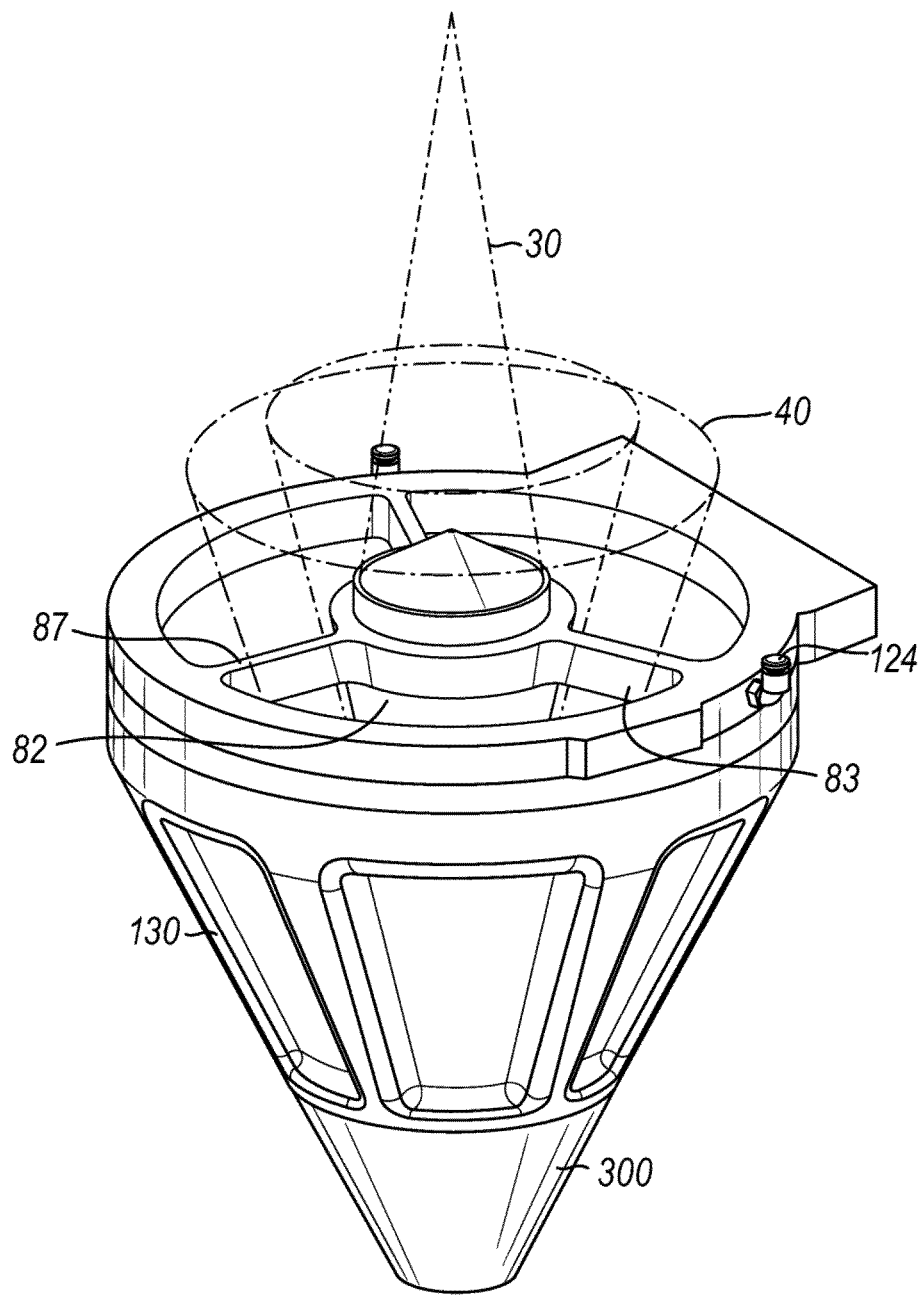
FIG. 5 depicts a perspective view of the conical mirror, spoked support plate, central support, lower housing portion, and reflective nozzle of the system and apparatus of FIG. 1, wherein the diverging laser beam is shown entering the optical housing and the coaxial focusing laser beam is shown passing downward through the lower housing portion.

With reference to FIGS. 1-5, FIG. 1 depicts a cross-sectional view of an example implementation of a coaxial laser/wire optical system and apparatus for use in additive manufacturing processes; FIG. 2 depicts a close-up view of the nozzle component of the system and apparatus of FIG. 1; FIG. 3A depicts a perspective view of the nozzle component of the system and apparatus of FIG. 1, wherein the system and apparatus is fully assembled; FIG. 3B depicts an alternate perspective view of the nozzle component of the system and apparatus of FIG. 1, wherein the system and apparatus is fully assembled; FIG. 4 depicts a perspective view of the spoked support plate, central support, and lower housing portion of the system and apparatus of FIG. 1; and FIG. 5 depicts a perspective view of the conical mirror, spoked support plate, central support, lower housing portion, and reflective nozzle of the system and apparatus of FIG. 1, wherein the diverging laser beam is shown entering the optical housing and the coaxial focusing laser beam is shown passing downward through the lower housing portion.

In the example implementation shown in the Figures, coaxial laser-wire apparatus or feed head 10 includes optical housing 100, which includes upper housing portion 110, middle housing portion 120, and lower housing portion 130, which are connected to one another by a series of connectors 200. Upper housing portion 100 includes chamber 112 formed centrally and longitudinally therein and one or more purge gas inlets/ports 114 through which gas may be supplied to the interior of optical housing 100. Middle housing portion 120 includes chamber 122 formed centrally and longitudinally therein as well as cooling water inlet 124 and cooling water exit 126. Lower housing portion 130 includes chamber 132 formed longitudinally therein around central support 82. Reflective nozzle 300, also referred to as a coaxial gas shielding nozzle, is connected to lower housing portion 130 and includes nozzle chamber 310 formed centrally and longitudinally therein. A portion of chamber 310 is constricted to form annular aerodynamic window 312 for preventing contaminants and debris from entering optical housing 100 and damaging the internal components thereof.

Wire feedstock or wire 50 is fed into conduit 60 (also referred to as a wire feed liner), which passes in an angular manner through upper housing portion 110, middle housing portion 120, and lower housing portion 130. Conduit 60 includes a protective copper sheathing on the outer surfaces thereof in areas that contacting laser beam 30, which assists in reflecting laser beam 30 and preventing wire 50 and conduit 60 from absorbing laser light. In example implementations, conduit 60 can accept any round wire up to a diameter of 5 mm (0.2 in). Conduit 60 delivers wire 50 directly through optical housing 100 while minimizing transitions and preventing wire feeding complications. Wire 50 exits conduit 60 at the upper portion of nozzle 300, passes into and through wire steering (wire alignment) mechanism 400, out of the bottom portion of nozzle 300 (see FIG. 2), and onto a work surface. Wire steering mechanism 400 is located within chamber 310 and operates to position wire feedstock 50 perpendicular or normal to a work surface. Wire steering mechanism 400 is manually adjustable for directing or positioning wire 50, as necessary or desired. This device can be used to align wire 50 with laser beam 40 and maximize equal heating. Wire 50 can be tilted inside a ball type joint (see FIG. 1) included in wire steering mechanism 400 and locked into position upon proper alignment. The inclusion of an internal wire management system provides a high degree of dimensional stability for wire 50 and facilitates inclusion of annular aerodynamic window 312 as a contaminant rejection solution.

Connector 20 is attached to the top of upper housing portion 110 for receiving a commercially available fiber laser which directs diverging laser beam 30 into chamber 112. In example implementations, the fiber connection accepts QBH 8 and QBH 16 connections, although other connection types are possible. Diverging laser beam 30 first encounters conical (or toroidal) mirror 80, which is located on top of support plate 81, centered thereon with locating pin 89, and supported within optical housing 100 by central support 82. Conical (or toroidal) mirror 80 is cooled by water entering and exiting optical housing 100 through cooling water inlet 124 and cooling water exit 126 respectively. As best shown in FIG. 4, support plate 81 includes first spoke 83 that includes first channel 84, second spoke 85 that includes second channel 86, third spoke 87, and cavity 88. Cooling water flows toward cavity 88 through first channel 84 and away from cavity 88 through second channel 86. Laser beam 30 then expands radially outward where it then encounters toroidal mirror 90 (also referred to as a ring reflective optic). As the laser beam travels radially outward, its irradiance decreases substantially such that it is safely reflected by the protective sheathing provided on conduit 60, which guides the AM wire. Toroidal mirror 90 then redirects the laser energy into coaxial focusing laser beam 40 which surrounds the outer diameter of wire 70 near the bottom of nozzle 300. The specific design of toroidal mirror 90 permits laser irradiance on the outside surface of the AM wire to be controlled along the length of the beam-wire interaction region, thereby permitting a high degree of control of wire melting efficiency. Thus, wire 70, laser beam 40 and shielding gas all arrive at a highly controllable processing zone and melt the AM wire onto a work surface.

Removing absorbed heat from reflective optics is still a concern at high power levels; therefore, water cooling is utilized to extend reflective optic life and improve performance. Water cooling passages 124 and 126 are illustrated in FIGS and 4. 1. Inert coaxial purge gas is supplied to the laser beam path for maintaining positive pressure inside optical housing 100 to prevent contamination and to assisting with overall cooling. Nozzle 300 directs the coaxial gas to the work plane and supplies primary shielding against build-up. Coaxial gas flows down the laser beam path through a narrowing gap (i.e., annular aerodynamic window 312). This reduction in cross sectional area increases flow velocities in localized areas, thereby helping to resist and expel any contaminants generated on the work surface during the AM process.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this specification are used to describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed inventive subject matter. Various functions and elements described herein may be partitioned differently from those shown without departing from the scope of the disclosed inventive subject matter. Generic principles defined herein may be applied to other implementations. Different numbers of a given module or unit may be employed, a different type or types of a given module or unit may be employed, a given module or unit may be added, or a given module or unit may be omitted.

It should be appreciated that all combinations of the foregoing concepts and additional concepts discussed in greater detail herein (provided such concepts are not mutually inconsistent) are contemplated as being part of the disclosed inventive subject matter. In particular, all combinations of claimed subject matter appearing at the end of this disclosure are contemplated as being part of the inventive subject matter disclosed herein. While the disclosed inventive subject matter has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed inventive subject matter in its broader aspects is not limited to any of the specific details, representative devices and methods, and/or illustrative examples shown and described. Accordingly, departures may be made from such details without departing from the spirit or scope of the general inventive concept.

What is claimed:

1. An apparatus for use in laser wire additive manufacturing, comprising:
 (a) an optical housing, wherein the optical housing includes:
  (i) an upper portion, wherein the upper portion is connected to a laser, and wherein the laser directs a laser beam into and through the optical housing;
  (ii) a middle portion connected to the upper portion; and
  (iii) a lower portion connected to the middle portion;
 (b) a laser beam reflecting shielded conduit disposed within the optical housing at a predetermined angle, wherein the laser beam reflecting shielded conduit passes through the upper, middle, and lower portions of the optical housing, wherein the laser beam reflecting shielded conduit receives an additive manufacturing wire therein, wherein the additive manufacturing wire passes through an entire length of the laser beam reflecting shielded conduit, and wherein the laser beam reflecting shielded conduit prevents the additive manufacturing wire from absorbing light from the laser;

(c) a nozzle connected to the lower portion of the housing for receiving the wire from the conduit, wherein the nozzle includes a constricted portion that forms a contamination reducing annular aerodynamic window therein, wherein the contamination reducing annular aerodynamic window prevents contaminants and debris generated from additive manufacturing from entering the optical housing;

(d) a manually adjustable wire steering and alignment mechanism disposed within the nozzle coaxially with the laser beam, wherein the manually adjustable wire steering and alignment mechanism includes a ball type joint that reorients the wire exiting the lower portion of the optical housing into a position coaxial with the laser beam and perpendicular to a work surface;

(e) a first reflective optic disposed within the middle portion of the housing for receiving and reflecting the laser beam, wherein the first reflective optic includes either a conical mirror or a toroidal mirror; and (f) a second reflective optic disposed within the middle portion of the housing for receiving laser light reflected by the first reflective optic, wherein the second reflective optic includes a toroidal mirror, wherein the second reflective optic directs the laser light received from the first reflective optic onto the wire in a cylindrical configuration such that the wire and the laser light are coaxial with regard to one another within the nozzle.

2. The apparatus of claim 1, further comprising at least one gas inlet formed in the optical housing, wherein the gas inlet is adapted to receive pressurized gas therethrough, and wherein the pressurized gas provides shielding at the work surface.

3. The apparatus of claim 1, further comprising at least one water inlet and at least one water exit for allowing cooling water to flow into and through the optical housing for cooling the first reflective optic.

4. The apparatus of claim 1, further comprising a plate for supporting the first reflective optic, wherein the supportive plate is adapted to provide cooling water to the optical housing, and wherein the supportive plate includes a plurality of spokes formed therein for allowing reflected laser light to pass therethrough.

\* \* \* \* \*